(12) United States Patent
Eshraghi

(10) Patent No.: US 6,884,539 B2
(45) Date of Patent: Apr. 26, 2005

(54) MICROCELL ELECTROCHEMICAL DEVICES AND ASSEMBLIES WITH CORROSION-RESISTANT CURRENT COLLECTORS, AND METHOD OF MAKING THE SAME

(75) Inventor: Ray R. Eshraghi, Cary, NC (US)

(73) Assignee: Microcell Corporation, Raleigh, NC (US)

( * ) Notice: Subject to any disclaimer, the term of this patent is extended or adjusted under 35 U.S.C. 154(b) by 498 days.

(21) Appl. No.: 10/188,471

(22) Filed: Jul. 2, 2002

(65) Prior Publication Data

US 2004/0005498 A1 Jan. 8, 2004

(51) Int. Cl.[7] ................ H01M 2/18
(52) U.S. Cl. ............ 429/40; 429/44; 429/237; 429/245; 429/140; 29/2; 29/623.1; 29/623.5
(58) Field of Search ............ 429/40, 44, 237, 429/245, 140; 29/2, 623.5

(56) References Cited

U.S. PATENT DOCUMENTS

| | | | |
|---|---|---|---|
| 2,753,623 A | | 7/1956 | Boessenkool et al. |
| 3,220,107 A | | 11/1965 | Clark |
| 3,408,727 A | | 11/1968 | Dion |
| 3,455,016 A | | 7/1969 | Dion et al. |
| 3,600,790 A | | 8/1971 | Dion et al. |
| 3,714,701 A | | 2/1973 | Dion et al. |
| 4,227,061 A | | 10/1980 | Westfall et al. |
| 4,411,762 A | * | 10/1983 | Kline ............ 205/96 |
| 4,933,141 A | | 6/1990 | Mankins et al. |
| 5,279,625 A | * | 1/1994 | O'Neil-Bell ............ 29/623.4 |
| 5,296,316 A | * | 3/1994 | O'Neil-Bell ............ 429/104 |
| 5,483,022 A | | 1/1996 | Mar |
| 5,693,203 A | * | 12/1997 | Ohhashi et al. ............ 204/298.12 |
| 5,897,963 A | | 4/1999 | Seuntjens |
| 5,916,514 A | | 6/1999 | Eshraghi |
| 5,928,808 A | | 7/1999 | Eshraghi |
| 5,989,300 A | | 11/1999 | Eshraghi |
| 6,004,691 A | * | 12/1999 | Eshraghi ............ 429/133 |
| 6,156,452 A | * | 12/2000 | Kozuki et al. ............ 429/211 |
| 6,338,913 B1 | | 1/2002 | Eshraghi |
| 6,399,232 B1 | | 6/2002 | Eshraghi |
| 6,403,248 B1 | | 6/2002 | Eshraghi |
| 6,403,517 B1 | | 6/2002 | Eshraghi |
| 6,444,339 B1 | | 9/2002 | Eshraghi |
| 6,495,281 B1 | * | 12/2002 | Eshraghi ............ 429/40 |

* cited by examiner

*Primary Examiner*—Mark Ruthkosky
(74) *Attorney, Agent, or Firm*—Yongzhi Yang; Steven J. Hultquist; Marianne Fuierer

(57) ABSTRACT

A fibrous microcell structure comprising: (1) an inner electrode, (2) a hollow fibrous membrane separator in contact with the inner electrode, (3) an electrolyte embedded in the hollow fibrous membrane separator, and (4) an outer electrode, wherein at least one of the inner and outer electrodes comprises a metal clad composite having two or more metal layers bonded together by solid-phase bonding. Preferably, such fibrous microcell structure is a fuel cell that comprises inner current collector, an inner catalyst layer, a hollow fibrous membrane separator in contact with the inner catalyst layer and the inner current collector, an electrolyte embedded in the hollow fibrous membrane separator, an outer catalyst layer, and an outer current collector.

40 Claims, 4 Drawing Sheets

MICROCELL ELECTROCHEMICAL DEVICES AND ASSEMBLIES WITH CORROSION-RESISTANT CURRENT COLLECTORS, AND METHOD OF MAKING THE SAME

BACKGROUND OF THE INVENTION

I. Field of the Invention

This invention relates to microcell electrochemical devices and assemblies, and method of making the same. More specifically, this invention relates to microcell electrochemical devices and assemblies that comprise current collectors of high electrical conductivity, high corrosion resistance, and high mechanical endurance and resistance to peeling and wearing.

II. Description of the Art

Electrochemical cells, such as batteries and fuel cells, have positive and negative electrodes that are separated in such manner as to avoid internal short-circuiting, while the electrodes are in contact with an electrolyte medium, which chemically reacts with the electrodes to generate flow of electrons, thus providing electrical energy when the circuit is coupled with an external load.

A recent innovation in the electrochemical energy field is the development of microcells—small-sized electrochemical cells for battery, fuel cell and other electrochemical device applications. The microcell technology is described in U.S. Pat. Nos. 5,916,514; 5,928,808; 5,989,300; 6,004,691; 6,338,913; and 6,399,232, all to Ray R. Eshraghi. The microcell structure described in these patents comprises hollow fiber structures with which electrochemical cell components are associated.

The aforementioned Eshraghi patents describe an electrochemical cell structure in microfiber form, which contains a first current collector, a membrane separator, electrolyte medium, and a second current collector. Specifically, the Eshraghi patents disclose a hollow fibrous membrane separator, impregnated with electrolyte medium and having a first metal fiber (inner current collector) disposed inside thereof and a second metal fiber (outer current collector) disposed on the outer surface of such hollow fibrous membrane separator, wherein the first and second metal fibers constitute positive and negative current collectors of the microcell.

Multiple fibrous microcells as described hereinabove can then be serially and/or parallelly connected together, and packed/bundled into a unitary microcell assembly, which is characterized by high current density and high voltage output.

The positive and negative current collectors of the Eshraghi microcells, as described in the above-listed patents, are in contact with the reactive electrolyte medium. They therefore are subjected to a harsh chemical environment. Since the current collectors of the microcells are formed of very thin metal fibers, they are especially susceptible to corrosion, which may result in electrical disconnection within individual microcells or between serially or parallelly connected microcells, eventually shortening the useful life and/or reducing the power density of the microcell assemblies.

Eshraghi U.S. Pat. No. 6,338,913 and No. 6,399,232 suggest several corrosion management structures for enhancing the corrosion resistance of the current collectors in the microcell devices or structures. For example, current collectors can be manufactured from graphite materials; alternatively, current collectors can be formed of aluminum or copper coated with corrosion-resistant carbonaceous coatings. Although the graphite or carbon-coated current collectors have significantly enhanced corrosion resistance in comparison with the conventional metal current collectors, they are not mechanically robust (i.e., the graphite current collectors are easily broken, and the carbon coating are easily peeled off, exposing the underlying metal core to the corrosive electrolyte), which will result in eventual electrical disconnection within or between the microcells.

There therefore is a continuing need in the art to identify and utilize improved materials for forming current collectors of high corrosion-resistance, high electrical conductivity, and high mechanical integrity in such microcell structures, and it is accordingly an object of the present invention to provide a microcell structure or assembly comprising current collectors formed of corrosion-resistant materials for significantly prolonging the useful life and enhancing the reliability of such microcell structure or assembly.

SUMMARY OF THE INVENTION

The present invention in one aspect relates to a fibrous microcell structure comprising:

- an inner electrode,
- a hollow fibrous membrane separator in contact with the inner electrode,
- an electrolyte embedded in the hollow fibrous membrane separator, and
- an outer electrode, wherein at least one of the inner and outer electrodes comprises a metal clad composite having two or more metal layers bonded together by solid-phase bonding.

Another aspect of the present invention relates to an electrochemical cell device, including a plurality of fibrous microcell structures as described hereinabove. Such electrochemical cell device can be either a fuel cell or a battery cell. Preferably, such electrochemical cell device is a fuel cell.

Yet another aspect of the present invention relates to a fuel cell comprising microcell fibrous elements, wherein each microcell fibrous element comprises an inner current collector, an inner catalyst layer, a hollow fibrous membrane separator in contact with the inner catalyst layer and the inner current collector, an electrolyte embedded in the hollow fibrous membrane separator, an outer catalyst layer, and an outer current collector, wherein at least one of the inner and outer current collectors comprises a metal clad composite having two or more metal layers bonded together by solid-phase bonding.

Other aspects, features and advantages of the invention will be more fully apparent from the ensuing disclosure and appended claims.

DETAILED DESCRIPTION OF THE INVENTION, AND PREFERRED EMBODIMENTS THEREOF

Figure 1:
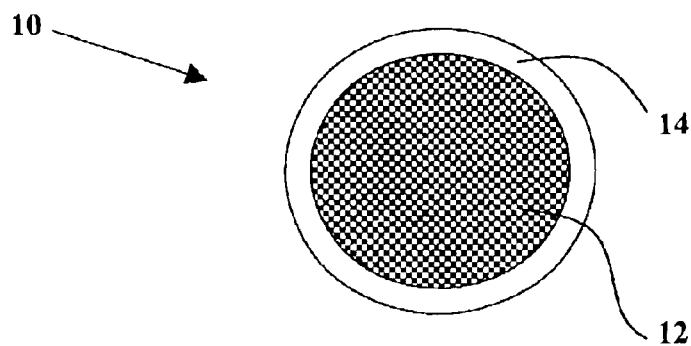
FIG. 1 is a cross-sectional view of a microcell current collector formed of a two-layer metal clad composite, according to one embodiment of the present invention.

The disclosures of Eshraghi U.S. Pat. Nos. 5,916,514; 5,928,808; 5,989,300; 6,004,691; 6,338,913; and 6,399,232 hereby are incorporated herein by reference, in their respective entireties and for all purposes.

As used herein, the term "microcell" refers to an electrochemical cell energy generation or conversion structure, including a membrane separator having electrolyte embedded therein. The electrolyte material can be a solid ion-exchanging material evenly distributed within the membrane separator, or solid ion-exchanging particles immobilized in micropores of the membrane separator; alternatively, the membrane separator itself may be formed of ion-exchanging material that functions as electrolyte medium. The membrane separator is in contact with electrically conductive fibers, which in turn are in contact with or are coated with electrocatalyst and form positive and negative electrodes for the electrochemical cell.

While the ensuing description herein is primarily directed to fuel cell embodiments of the instant invention, it will be appreciated that the description can be analogously applied to corresponding battery cells and to other forms of electrochemical cell devices, consistent with the invention.

A battery cell of course differs from a fuel cell in that the electrochemically active material in a battery is present and stored in the cell, as opposed to being externally furnished to the structure when electrochemical activity is desired, as in a fuel cell. Accordingly, when used in a battery cell, the microcell does not require a lumen at the center of the fiber, thereby correspondingly simplifying the bundling of fibers in modular assemblies for battery cell applications. Microcells for battery cell applications thus have structural and operational differences from microcells used in fuel cells.

In a specific embodiment of the present invention, the microcell comprises an inner electrode, a membrane separator in contact with the inner electrode, electrolyte embedded in the membrane separator, and an outer electrode, wherein at least one of the inner and outer electrodes comprises a metal clad composite having a metal core formed of a first metal or metal alloy, and a metal outer layer formed of a second metal or metal alloy, wherein the metal core and the metal outer layer are bonded to each other at their interfacial surfaces by solid-phase bonding.

In conventional fuel cells, use of naked solid metal material is generally avoided, due to the high corrosiveness of the electrochemical reactive materials and the electrolyte. Material for forming current collectors in such conventional fuel cells generally have been limited to graphite type materials. However, graphite materials have very poor mechanical strength and formability and are not suitable to form microfibrous current collectors in the microcell structures, wherein the outer diameter of such microfibrous current collectors is usually within the range of from about 100 μm to about 10 mm.

Eshraghi U.S. Pat. No. 6,338,913 and No. 6,399,232 suggest coating aluminum or titanium current collectors with corrosion-resistant materials, such as carbonaceous material or amorphous metal. However, such coatings lack uniformity and leave pinholes at certain area susceptible to corrosion. Moreover, such coatings are only loosely bonded to the underlying current collector element via Van der Waals forces, and thus have the tendency to peel and delaminate from the current collector element under the severe corrosive conditions and thermal cycles that characterize the fuel cell operation.

Despite the conventional wisdom that avoids use of naked solid metal materials in the fibrous microcell structures, the present invention employs a metal clad composite in forming the fibrous current collectors of the electrodes in the microcell devices or structures described hereinabove, which shows good corrosion resistance and high mechanical strength and formability in comparison with the above-mentioned graphite or carbon-coated current collectors. The use of solid metal materials without any carbon coating or amorphous metal coating, in the metal clad composites of the present invention, thus embodies an approach that has been contraindicated by the conventional wisdom and approach of the prior art, but use of such metal clad composites achieve surprisingly satisfactory results that have not been contemplated by the conventional wisdom, with respect to corrosion resistance, electrical conductivity, mechanical strength, and reliability.

FIG. 1 shows a cross-sectional view of a current collector 10 useful in a microcell as described hereinabove. The microcell current collector 10 is a two-layer metal clad composite, comprising a metal core 12 and a metal outer layer 14.

The metal core 12 is formed of a first metal or metal alloy, preferably a metal or metal alloy that is characterized by a low electrical resistance (e.g., resistance less than $10\,\mu\Omega\cdot\text{cm}$, preferably less than $1\,\mu\Omega\cdot\text{cm}$), high mechanical strength, good formability, and low manufacturing cost, such as copper, aluminum, brass, bronze, nickel, silver, etc. More preferably, the metal core 12 is formed of a metal selected from the group consisting of copper and aluminum, and alloys thereof, and most preferably, the metal core 12 is formed of copper.

The metal outer layer 14 is formed of a second metal or metal alloy, preferably a metal or metal alloy that is characterized by high corrosion-resistance, high mechanical strength, and good formability, such as titanium, niobium, nickel, zirconium, gold, tantalum, platinum, palladium, silver, etc. More preferably, the metal outer layer 14 is formed of a metal selected from the group consisting of titanium, niobium, nickel, gold, platinum, and alloys thereof, and most preferably, such metal outer layer 14 is formed of titanium.

The above lists of metals and metal alloys are only exemplary and are not intended to limit the broad scope of the present invention.

The metal core 12 and the metal outer layer 14 are bonded together at their interfacial surface by solid-phase bonding, which is the bonding of two different metals without the formation of any liquid phase material at their interfaces.

The solid-phase bonding of two different metals is achieved by a hot co-extrusion process, wherein the two metals are pressed together at an elevated temperature, to cause deformation of such metals in form of reduction in cross-sectional area of the metals. The elevated temperature is within a range of from just above the minimum re-crystallization temperature of the metal that has the lower re-crystallization temperature to the highest temperature at which both metals may be deformed without any pulling apart or any formation of brittle compounds or liquid phase material at the interface of the metals being bonded. By applying pressure at such elevated temperature, it is possible to solid-phase bond layers of any two or more metals to form a multiple-layer metal clad composite.

The strength of the solid-phase bonding is a function of the elevated temperature and the amount of deformation that such metals undergo. Preferably, the elevated temperature is within a range of from about 400° C. to about 900° C., and the amount of deformation that such metals undergo is expressed as a reduction in cross-sectional area ratios of such metals, e.g., in a range of from about 7:1 (i.e., the cross-sectional area reduces from 7 to 1 due to such deformation) to about 64:1 (i.e., the cross-sectional area reduces from 64 to 1 due to such deformation).

The solid-phase bonding formed according to the above-described method can be further strengthened by a subsequent sintering step. The thermal energy provided by such sintering step increases atomic mobility of the metals and effects growth of the bond areas at the bonding interface between the metals. As a result, the solid-phase bonding between such metals is further strengthened.

In another embodiment of the present invention, at least one of the inner and outer electrodes of the microcells comprises a metal clad composite having a metal core formed of a first metal or metal alloy, an intermediate metal layer formed of a second metal or metal alloy, and a metal outer layer formed of a third metal or metal alloy, wherein the metal core, the intermediate metal layer, and the metal outer layer are bonded to one another at their respective interfacial surfaces by solid-phase bonding.

Figure 2:
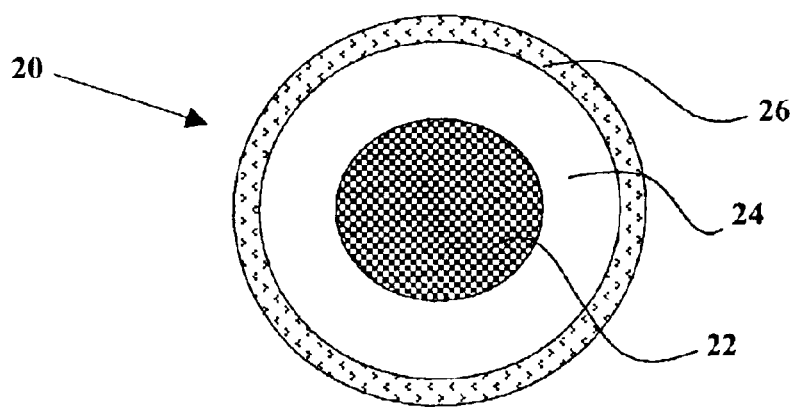
FIG. 2 is a cross-sectional view of a microcell current collector formed of a three-layer metal clad composite, according to another embodiment of the present invention.

FIG. 2 shows a cross-sectional view of a microcell current collector 20 as described hereinabove. The microcell current collector 20 is a three-layer metal clad composite, comprising a metal core 22, an intermediate metal layer 24, and a metal outer layer 26.

The metal core 22 is formed of a first metal or metal alloy, preferably a metal or metal alloy that is characterized by low electrical resistance (i.e., resistance less than 10 $\mu\Omega\cdot$cm, preferably less than 1 $\mu\Omega\cdot$cm), high mechanical strength, good formability, and low manufacturing cost, such as copper, aluminum, brass, bronze, nickel, silver, etc. More preferably, the metal core 22 is formed of a metal selected from the group consisting of copper and aluminum, and alloys thereof, and most preferably, the metal core 12 is formed of copper.

The intermediate metal layer 24 and the metal outer layer 26 are formed of a second metal and a third metal or metal alloy, respectively. The second and the third metals or metal alloys preferably are characterized by high corrosion-resistance, high mechanical strength, and good formability, such as titanium, niobium, nickel, zirconium, gold, tantalum, platinum, palladium, silver, etc. More preferably, the second metal or metal alloy for forming the intermediate metal layer 24 is selected from the group consisting of titanium, niobium, nickel, and alloys thereof, and the third metal or metal alloy for forming the metal outer layer 26 is selected from the group consisting of niobium, platinum, tantalum, gold, zirconium, and alloys thereof. Most preferably, the intermediate metal layer 24 is formed of titanium or titanium alloy, and the metal outer layer 25 is formed of niobium or niobium alloy.

As mentioned hereinabove, the specific metals and metal alloys identified herein are only exemplary and are not intended to limit the broad scope of the present invention.

The following is a list of preferred two- and three-layer metal clad composites useful for forming the microcell current collectors of the present invention:

| Metal Composite No. | Metal Core | Intermediate Layer | Outer Layer |
| --- | --- | --- | --- |
| 1 | Copper | X | Titanium |
| 2 | Copper | X | Nickel |
| 3 | Copper | Titanium | Platinum |
| 4 | Copper | Titanium | Gold |
| 5 | Copper | Titanium | Tantalum |
| 6 | Copper | Titanium | Niobium |
| 7 | Copper | Titanium | Zirconium |
| 8 | Copper | Niobium | Platinum |
| 9 | Copper | Nickel | Platinum |
| 10 | Copper | Nickel | Gold |

Figure 3:
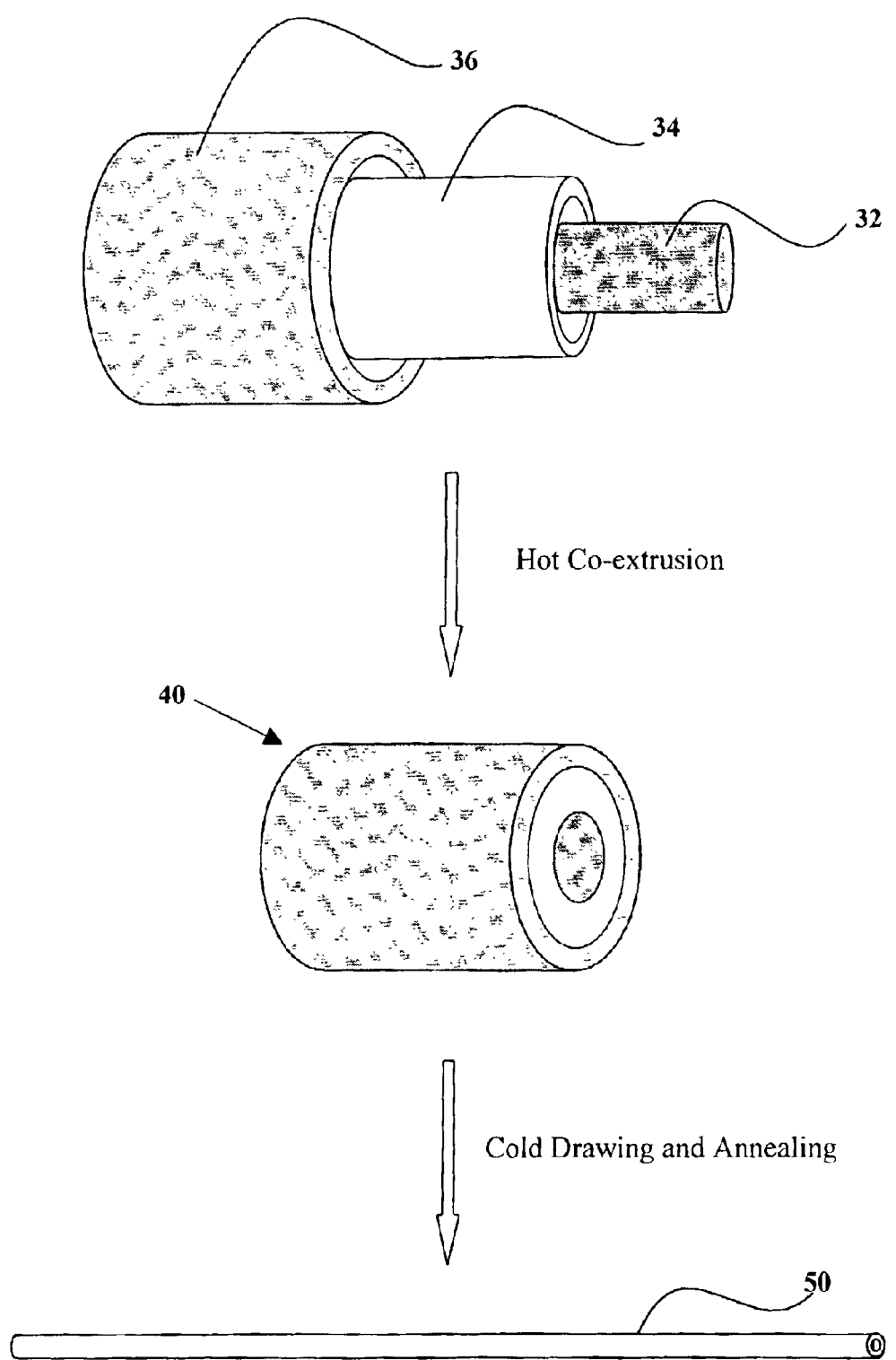
FIG. 3 is a schematic representation of formation of the three-layer metal clad current collector of FIG. 2 from a metal billet.

According to a preferred embodiment of the present invention, the three-layer microcell current collector 20 of FIG. 2 is formed by the following steps (as shown in FIG. 3):

(1) providing a base metal rod 32 comprising the metal or metal alloy for forming the metal core 22 of FIG. 2, such as copper or aluminum;

(2) providing a first metal tube 34 comprising the metal or metal alloy for forming the intermediate metal layer 24 of FIG. 2, such as titanium, niobium, or nickel, wherein the first metal tube 34 has an inner diameter that is larger than the diameter of the base metal rod 32, so that the first metal tube 34 can fit around the base metal rod 32;

(3) providing a second metal tube 36 comprising the metal or metal alloy for forming the metal outer layer 26 of FIG. 2, such as niobium, tantalum, platinum, or gold, wherein the second metal tube 36 has an inner diameter that is larger than the outer diameter of the first metal tube 34, so that the second metal tube 36 can fit around the first metal tube 34;

(4) hot co-extruding the base metal rod 32, the first metal tube 34, and the second metal tube 36 together to form a metal billet 40 that comprises three layers of metals bonded together by solid-phase bonding; and (5) drawing the metal billet 40 into thin metal wire 50 via a series of cold drawing and annealing steps, wherein the thin metal wire 50 is characterized by fibrous conformation and small diameter, and wherein the thin metal wire 50 comprises three different metal layers (cannot be seen in FIG. 3) corresponding to the metal core 22, the intermediate metal layer 24, and the metal outer layer 26 in FIG. 2.

The thin metal wire 50 can be cut into appropriate lengths and used to form the inner and/or outer current collectors of the microcell structure or microcell assembly as described hereinabove.

The microcell current collectors of the present application may have an outer diameter within a range of from about 100 $\mu$m to about 10 mm, more preferably from about 100 $\mu$m to about 1000 $\mu$m, and most preferably from about 200 $\mu$m to about 500 $\mu$m.

If the microcell current collector of the present application comprises a two-layer metal clad composite as described hereinabove, the metal core may have an outer diameter within a range of from about 10 $\mu$m to about 10 mm, more preferably from about 100 $\mu$m to about 1000 $\mu$m, and most preferably from about 150 $\mu$m to about 500 $\mu$m.

If the microcell current collector of the present application comprises a three-layer metal clad composite as described hereinabove, the intermediate metal layer may have an outer diameter within a range of from about 100 μm to about 10 mm, more preferably from about 100 μm to about 1000 μm, and most preferably from about 200 μm to about 500 μm, while the metal core may have an outer diameter within a range of from about 10 μm to about 10 mm, more preferably from about 100 μm to about 1000 μm, and most preferably from about 150 μm to about 500 μm.

However, the microcell current collectors of the present application are not limited to the two-layer or three-layer metal clad composite described hereinabove. A person ordinarily skilled in the art can readily design metal clad composites having additional layers of metal or non-metal conductive materials, such as conductive polymers, carbonaceous materials, or conductive ceramics, etc., for the purpose of further enhancing the corrosion resistance and mechanical strength of such metal clad composite for forming microcell current collectors useful for practicing the present application.

Moreover, the metal core of the metal clad composites is not limited to the solid form as described hereinabove. In a preferred embodiment of the present invention, such metal core may be a hollow, tubular metal element, through which heat-exchanging fluid (such as air or heat-exchanging liquids) can be passed. In such manner, the current collectors comprising such hollow, tubular metal core concurrently function as heat-exchanging tubes, for conducting heat generated by the electrochemical reaction out of the microcell system.

The conformation and shape of the metal clad composites are not limited to the illustrative examples that have been described hereinabove and shown in FIGS. 1–4. For example, such metal clad composites may have cross-sectional areas of various regular or irregular shapes, such as circular, semi-circular, oval, crescent, cross, triangle, square, rectangular, parallelogram, trapezium, polyhedron, star-like, etc. The surface of such metal clad composite may be smooth, rough, spiked, grooved, etc.

Figure 5A:
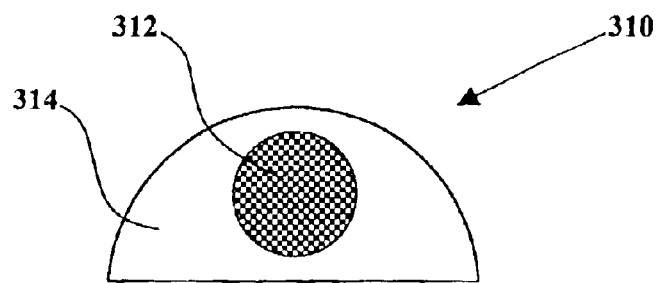
FIGS. 5A–C are cross-sectional views of microcell current collectors formed of metal clad composites of various shapes.
Figure 5B:
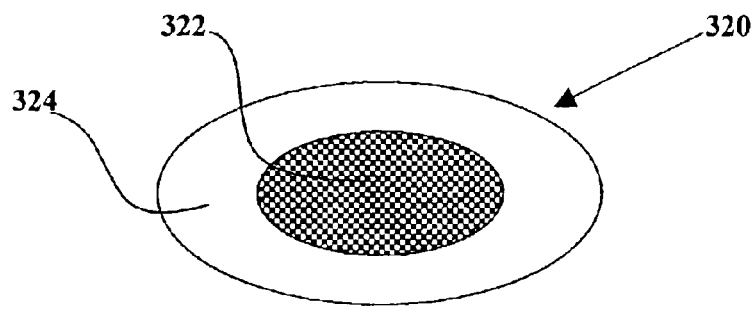
Figure 5C:
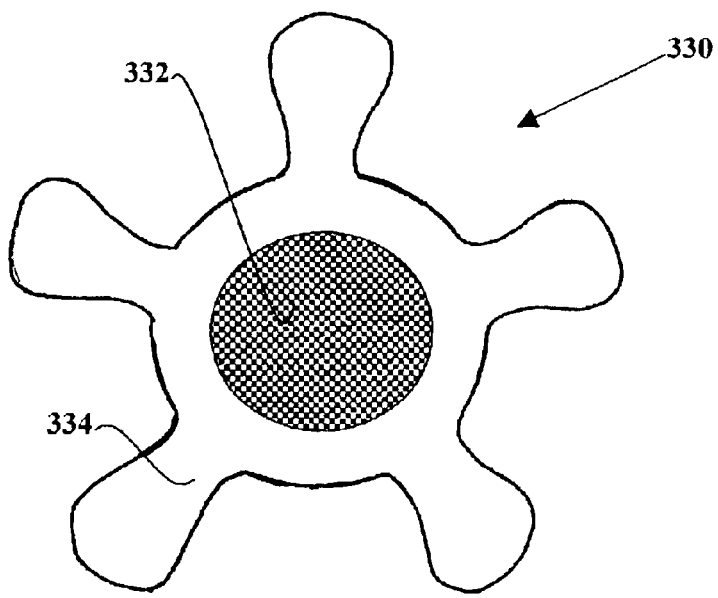

FIGS. 5A–C show various metal clad composites of different cross-sectional shapes. FIG. 5A shows a metal clad composite 310 of semi-circular shape, comprising a metal core 312 and a metal outer layer 314. FIG. 5B shows a metal clad composite 320 of oval shape, comprising a metal core 322 and a metal outer layer 324. FIG. 5C shows a metal clad composite 330 of star-like shape, comprising a metal core 332 and a star-like metal outer layer 334.

The microcell current collectors formed by the process described hereinabove comprise multiple layers of metals, while the metal core formed of copper or aluminum provides high electrical conductivity, the titanium, niobium, platinum, or gold intermediate/outer layer(s) provide high corrosion resistance against the harsh chemical environment to which such microcell current collectors are constantly exposed, and the solid phase bonding between the metal core and the intermediate/outer layer(s) ensures mechanical integrity and reliability of such layered structure, with minimum risk of such intermediate/outer layer(s) being peeled off the metal core. Each metal layer in such fibrous microcell current collectors is very thin (e.g., from about 1 μm to about 200 μm). However, each metal layer is substantially continuous and uniform through out the whole bonding surface, leaving few or no pinholes susceptible to corrosion.

By using such microcell current collectors, the useful life of the overall microcell structure or microcell assembly including same is significantly prolonged.

Figure 4:
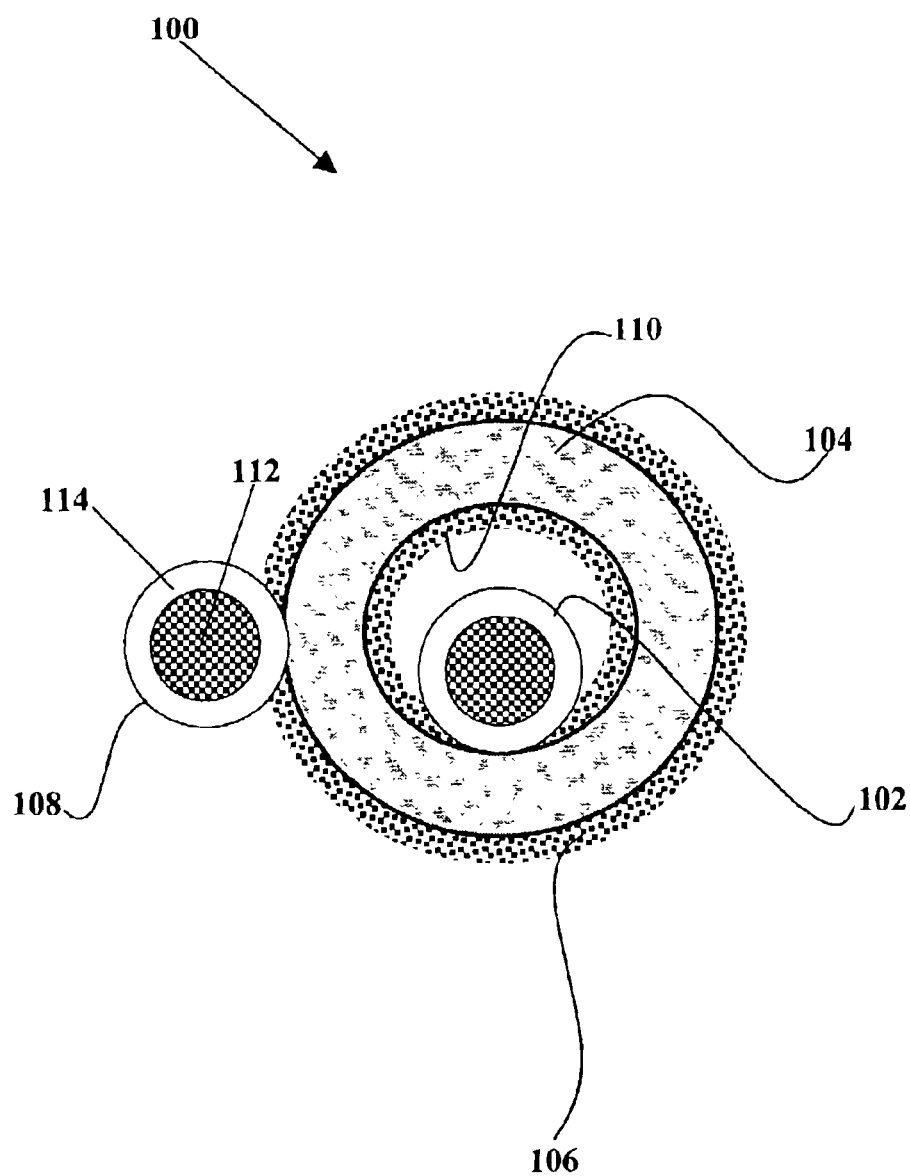
FIG. 4 is a cross-sectional view of a fibrous microcell structure, having both inner and outer current collectors formed of two-layer metal clad composites, according to one embodiment of the present invention.

FIG. 4 shows a fibrous fuel cell 100 comprising an inner current collector 102, an inner catalyst layer 110, a hollow fiber membrane separator 104 comprising an electrolyte (not shown) in contact with the inner catalyst layer 110 and the inner current collector 102, an outer catalyst layer 106, and an outer current collector 108, according to a preferred embodiment of the present invention. The electrolyte may be solid ion-exchanging particles impregnated in the hollow fiber membrane separator 104, or the hollow fiber membrane separator 104 may be formed entirely of ion-exchanging material that function as the electrolyte.

Both the inner and outer current collectors 102 and 108 are formed of two-layer metal clad composites, comprising a metal core 112 of copper and a metal outer layer 114 of titanium.

The microfibrous current collectors formed of metal clad composites as disclosed herein are characterized by significantly enhanced corrosion resistance, low electrical resistance, longer useful life, excellent mechanical strength and ductility, and greater reliability in comparison with the microfibrous current collectors or current collectors disclosed in Eshraghi U.S. Pat. Nos. 5,916,514; 5,928,808; 5,989,300; 6,004,691; 6,338,913; and 6,399,232.

While the invention has been described herein with reference to specific embodiments, features and aspects, it will be recognized that the invention is not thus limited, but rather extends in utility to other modifications, variations, applications, and embodiments, and accordingly all such other modifications, variations, applications, and embodiments are to be regarded as being within the spirit and scope of the invention.

What is claimed is:

1. A fibrous microcell structure comprising:
an inner electrode,
a hollow fibrous membrane separator in contact with the inner electrode,
an electrolyte embedded in the hollow fibrous membrane separator, and
an outer electrode,
wherein at least one of the inner and outer electrodes comprises a metal clad composite having two or more metal layers bonded together by solid-phase bonding.

2. The fibrous microcell structure according to claim 1, wherein said metal clad composite includes a metal core and a metal outer layer.

3. The fibrous microcell structure according to claim 2, wherein said metal core comprises a first metal or metal alloy selected from the group consisting of copper, aluminum, brass, bronze, nickel, silver, and mixtures or alloys thereof.

4. The fibrous microcell structure according to claim 2, wherein said metal core comprises copper or copper alloy.

5. The fibrous microcell structure according to claim 2, wherein said metal core comprises aluminum or aluminum alloy.

6. The fibrous microcell structure according to claim 2, wherein said metal outer layer comprises a second metal or metal alloy selected from the group consisting of titanium, niobium, nickel, zirconium, gold, tantalum, platinum, palladium, silver, and mixtures and alloys thereof.

7. The fibrous microcell structure according to claim 2, wherein said metal outer layer comprises a second metal or metal alloy selected from the group consisting of titanium, niobium, nickel, gold, platinum, and mixtures and alloys thereof.

8. The fibrous microcell structure according to claim 2, wherein said metal outer layer comprises titanium or titanium alloy.

9. The fibrous microcell structure according to claim 2, wherein said metal core comprises copper or copper alloy, and wherein said metal outer layer comprises nickel or nickel alloy.

10. The fibrous microcell structure according to claim 2, wherein said metal core comprises copper or copper alloy, and wherein said metal outer layer comprises titanium or titanium alloy.

11. The fibrous microcell structure according to claim 1, wherein said metal clad composite includes a metal core, an intermediate metal layer, and a metal outer layer.

12. The fibrous microcell structure according to claim 11, wherein said metal core comprises a first metal or metal alloy selected from the group consisting of copper, aluminum, brass, bronze, nickel, silver, and mixtures or alloys thereof.

13. The fibrous microcell structure according to claim 11, wherein said metal core comprises copper or copper alloy.

14. The fibrous microcell structure according to claim 11, wherein said metal core comprises aluminum or aluminum alloy.

15. The fibrous microcell structure according to claim 11, wherein said intermediate metal layer comprises a second metal or metal alloy selected from the group consisting of titanium, niobium, nickel, zirconium, gold, tantalum, platinum, palladium, silver, and mixtures and alloys thereof.

16. The fibrous microcell structure according to claim 11, wherein said intermediate metal layer comprises a second metal or metal alloy selected from the group consisting of titanium, niobium, nickel, and mixtures and alloys thereof.

17. The fibrous microcell structure according to claim 11, wherein said intermediate metal layer comprises titanium or titanium alloy.

18. The fibrous microcell structure according to claim 11, wherein said metal outer layer comprises a third metal or metal alloy selected from the group consisting of titanium, niobium, nickel, zirconium, gold, tantalum, platinum, palladium, silver, and mixtures and alloys thereof.

19. The fibrous microcell structure according to claim 11, wherein said metal outer layer comprises a third metal or metal alloy selected from the group consisting of platinum, gold, niobium, tantalum, zirconium, and mixtures and alloys thereof.

20. The fibrous microcell structure according to claim 11, wherein said metal outer layer comprises niobium or niobium alloy.

21. The fibrous microcell structure according to claim 11, wherein said metal core comprises copper or copper alloy, wherein said intermediate metal layer comprises titanium or titanium alloy, and wherein said metal outer layer comprises niobium or niobium alloy.

22. The fibrous microcell structure according to claim 11, wherein said metal core comprises copper or copper alloy, wherein said intermediate metal layer comprises titanium or titanium alloy, and wherein said metal outer layer comprises platinum or platinum alloy.

23. The fibrous microcell structure according to claim 11, wherein said metal core comprises copper or copper alloy, wherein said intermediate metal layer comprises titanium or titanium alloy, and wherein said metal outer layer comprises gold or gold alloy.

24. The fibrous microcell structure according to claim 11, wherein said metal core comprises copper or copper alloy, wherein said intermediate metal layer comprises titanium or titanium alloy, and wherein said metal outer layer comprises tantalum or tantalum alloy.

25. The fibrous microcell structure according to claim 11, wherein said metal core comprises copper or copper alloy, wherein said intermediate metal layer comprises titanium or titanium alloy, and wherein said metal outer layer comprises zirconium or zirconium alloy.

26. The fibrous microcell structure according to claim 11, wherein said metal core comprises copper or copper alloy, wherein said intermediate metal layer comprises niobium or niobium alloy, and wherein said metal outer layer comprises platinum or platinum alloy.

27. The fibrous microcell structure according to claim 11, wherein said metal core comprises copper or copper alloy, wherein said intermediate metal layer comprises nickel or nickel alloy, and wherein said metal outer layer comprises platinum or platinum alloy.

28. The fibrous microcell structure according to claim 11, wherein said metal core comprises copper or copper alloy, wherein said intermediate metal layer comprises nickel or nickel alloy, and wherein said metal outer layer comprises gold or gold alloy.

29. The fibrous microcell structure according to claim 1, wherein said metal clad composite has an outer diameter within a range of from about 100 $\mu$m to about 10 mm.

30. The fibrous microcell structure according to claim 1, wherein said metal clad composite has an outer diameter within a range of from about 100 $\mu$m to about 1000 $\mu$m.

31. The fibrous microcell structure according to claim 1, wherein said metal clad composite has an outer diameter within a range of from about 250 $\mu$m to about 500 $\mu$m.

32. The fibrous microcell structure according to claim 1, wherein said metal clad composite comprises more than three metal layers bonded together by solid-phase bonding.

33. The fibrous microcell structure according to claim 1, wherein said metal clad composite has a cross-sectional shape selected from the group consisting of circular, semicircular, oval, crescent, cross, triangle, square, rectangular, parallelogram, trapezium, polyhedron, and star-like.

34. The fibrous microcell structure according to claim 1, wherein said metal clad composite has a cross-sectional shape selected from the group consisting of circular, semicircular, oval, and star-like.

35. The fibrous microcell structure according to claim 2, wherein the metal core is a hollow, tubular metal element, through which heat-exchanging fluid flows, for conducting heat out of said fibrous microcell structure.

36. The fibrous microcell structure according to claim 11, wherein the metal core is a hollow, tubular metal element, through which heat-exchanging fluid flows, for conducting heat out of said fibrous microcell structure.

37. An electrochemical cell device, including a plurality of fibrous microcell structures as in claim 1.

38. An electrochemical cell device according to claim 37, constituting a fuel cell.

39. An electrochemical cell device according to claim 37, constituting a battery cell.

40. A fuel cell comprising microcell fibrous elements, wherein each microcell fibrous element comprises:
    an inner current collector,
    an inner catalyst layer,
    a hollow fibrous membrane separator in contact with the inner catalyst layer and the inner current collector,
    an electrolyte embedded in the hollow fibrous membrane separator,
    an outer catalyst layer, and
    an outer current collector,
wherein at least one of the inner and outer current collectors comprises a metal clad composite having two or more metal layers bonded together by solid-phase bonding.

* * * * *